Jan. 18, 1955
R. H. BLYTHE
2,700,114
PULSE NETWORK
Filed Jan. 17, 1946
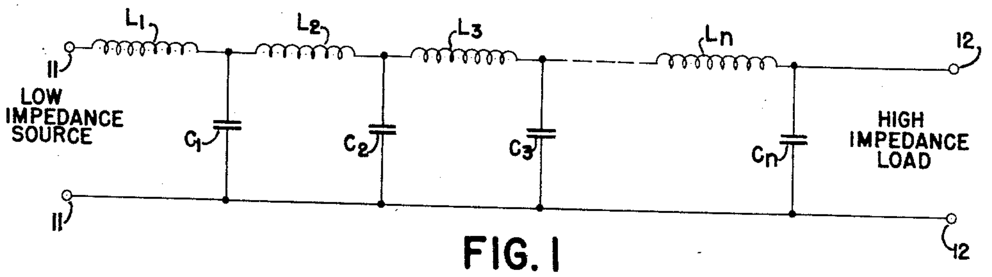
FIG. 1
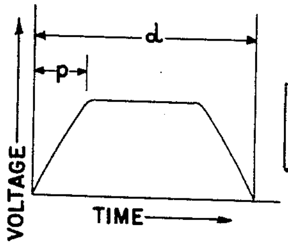
FIG. 2
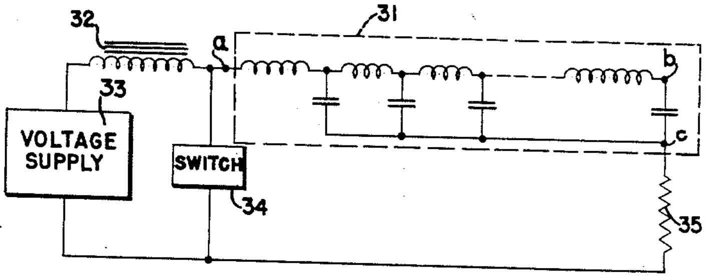
FIG. 4
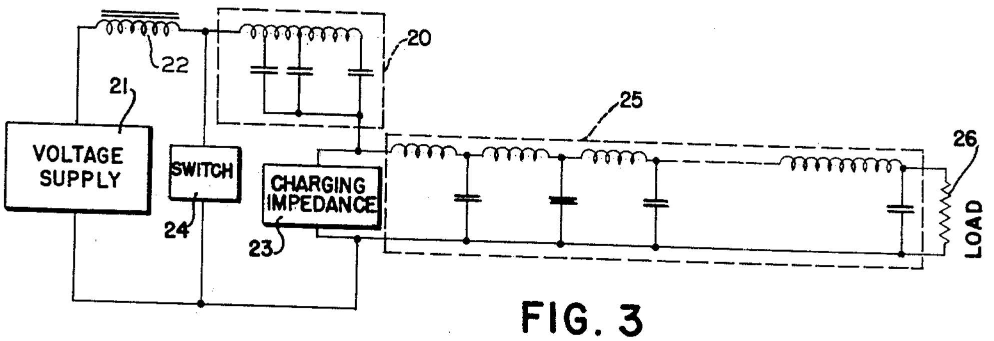
FIG. 3
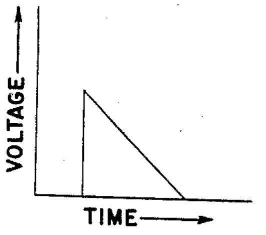
FIG. 5-A
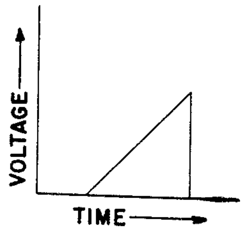
FIG. 5-B
INVENTOR
RICHARD H. BLYTHE
BY M. C. Hayes
ATTORNEY United States Patent Office 2,700,114
Patented Jan. 18, 1955

2,700,114

PULSE NETWORK

Richard H. Blythe, Boston, Mass., assignor, by mesne assignments, to the United States of America as represented by the Secretary of the Navy Application January 17, 1946, Serial No. 641,827

2 Claims. (Cl. 307—108)

This invention relates to electrical pulse networks, and more particularly to pulse networks which may be used as pulse transformers, and as pulse forming circuits.

It is the general practice in radar modulator circuits to use pulse forming networks to generate substantially rectangular voltage pulses of very short time duration, which pulses are used to modulate the radio frequency oscillator of the radar system. These pulses are usually generated at low impedance levels, and iron core pulse transformers are used to transform these impedance levels to the higher impedance level of the load. At present the minimum time duration of the voltage pulses which may be used in such systems is limited to the shortest pulses which can be passed by the pulse transformer without an appreciable change in the pulse shape. This invention is intended to overcome this difficulty and permit the transformation of the impedance level of voltage pulses of almost any degree of shortness.

In other applications of short-time voltage pulses, for example with impedances which are non-linear in time, or for nonlinear sweep generators, it may be desirable to use voltage pulses having non-rectangular shapes. This invention may be used as a pulse forming network to generate voltage pulses of a plurality of shapes for such applications.

Accordingly it is an object of this invention to provide an electrical network which will transform the impedance level of voltage pulses of extremely short time duration.

It is also an object of this invention to provide electrical pulse-forming networks which can be used to generate voltage pulses of a plurality of different shapes.

The manner in which the above and further objects of this invention may be accomplished will be explained by the following description and the appended drawing of which:

Fig. 1 is a schematic diagram of a network embodying the principles of the invention;

Fig. 2 is a voltage-time graph of a voltage pulse which will be passed by the network of Fig. 1;

Fig. 3 is a schematic diagram of a pulse generating system utilizing the invention as an impedance transformer;

Fig. 4 is a schematic diagram of a pulse generating system utilizing the invention as a pulse forming network; and Figs. 5A and 5B are graphs of the voltage pulses which may be obtained from the circuit of Fig. 4.

The network of Fig. 1 consists of a series of succeeding reactive sections as shown. $L_1, L_2, L_3, \ldots L_N$, and $C_1, C_2, C_3, \ldots C_N$ are the values of the inductances and capacitances of the respective sections. The values of the inductance and capacity parameters of the succeeding sections vary according to the following relations:

$$L_1<L_2<L_3< \ldots L_N$$
$$C_1>C_2>C_3> \ldots C_N$$
$$L_1C_1=L_2C_2=L_3C_3= \ldots L_NC_N$$

There may also be mutual inductance between the sections of the network. The impedance of any section of such a network is defined to be the square root of the quotient of the inductance and capacitance of that section expressed as $$Z_k=\sqrt{\frac{L_k}{C_k}}$$

In this expression $Z_k$ is the impedance, and the subscript $k$ is used to indicate that the equation refers to any section. From the above relations it can readily be seen that the impedance of each succeeding section of the network of Fig. 1 is greater than the impedance of the preceding section. It is then possible to connect a low impedance source to input terminals 11, and a high impedance load to output terminals 12, the network providing the necessary impedance transformation. The reverse connections to provide step-down impedance transformation may also be made.

Fig. 2 is a graph on a voltage-time plane of a pulse which can be passed by the network of Fig. 1. In Fig. 2 $p$ is the time of rise of the pulse to its full value, and $d$ is the total time duration of the pulse. The network of Fig. 1 is designed for a given duration pulse such that the relations $$\sqrt{L_kC_k}<p$$

and $$d<\sqrt{LC}$$

where L and C without subscripts are the total inductance and capacitance, respectively, of the network and $k$ has the meaning previously ascribed.

A complete pulse generating system utilizing the invention as a pulse transformer is shown in schematic form in Fig. 3. Pulse forming network 20 is charged from voltage source 21 through isolating impedance 22, and through charging impedance 23. Impedance 23 is a conducting network, resistance, tube, rectifier, or combination of elements that will permit pulse forming network 20 to charge, but does not drain off appreciable power during discharge of network 20, for example, a rectifier or electronic switching circuit. When network 20 is charged switch 24 is closed, permitting network 20 to discharge into pulse transforming network 25. Switch 24 may be a rotary spark gap or electronic switching circuit of one of the many types well known in the art. Network 25 is constructed according to the principles discussed with reference to Fig. 1. The incident pulse at a low impedance level starts down network 25 since impedance 23 offers high impedance during discharge. As the pulse travels down network 25 it sees progressively higher impedance in each succeeding LC section. The consecutive condensers charge and discharge in the usual fashion for the propagation of a voltage wave down an artificial line. As the succeeding condensers become smaller, the voltage across each succeeding condenser becomes higher, until at the load end the impedance is transformed to the higher level needed to match that of the load 26. In this manner the invention functions as a pulse transformer for pulses however short, provided the relations expressed with reference to Figs. 1 and 2 are met.

The network of Fig. 1 can be used as a pulse forming network if it is coupled into a circuit of the type shown in Fig. 4. In this circuit network 31 is charged from voltage supply 33 through isolating impedance 32. Switch 34 is then closed discharging network 31 through load impedance 35. Since all of the capacitances are charged to equal voltage, and the capacitance decreases for each succeeding section, the energy discharged per unit time through load 35 decreases with time. This will result in an output pulse across load 35 of the form shown in Fig. 5A. In this case the impedance of load 35 would be large compared to that of the first section of network 31. If the connections to terminals $a$ and $b$ of Fig. 3 were reversed the output pulse would have the form shown in Fig. 5B. The action of the invention in the production of the pulses of Fig. 5 can also be explained from the viewpoint of impedance. The voltage appearing across load 35 (Fig. 4) will bear a relation to the voltage to which network 31 is charged as given by the expression.

$$V^{(+)}_{load}=V_{network}\left[\frac{Z_{load}}{Z_{load}+Z_k}\right]$$

where $V^{(+)}_{load}$ is the voltage appearing across load 35 at a time $t$ after the initiation of the pulse.

$V_{network}$ is the voltage to which network 31 is charged by supply 33.

$Z_{load}$ is the impedance of the load 35.

$Z_K$ is the impedance of that section of network 31 which is an electrical distance from the discharge terminals corresponding to the time *t*.

From the above expression it will be seen that the voltage across the load will change with time inversely as the impedance of the network 31 changes in a direction away from the load. For the production of smooth pulses of the types shown in Figs. 5A and 5B it is necessary that the incremental change in impedance from section to section of the network be small. Smoothing and/or variation of the pulse shapes produced may be accomplished by the introduction of resistance into one or more of the reactive sections.

The voltage pulses obtained from the embodiment of Fig. 4 may be combined with other voltage pulses to provide pulses having a variety of shapes. For example, the output of the circuit of Fig. 4 may be added to the flat-topped output of a uniform pulse forming network to provide a trapezoidal waveform. Further, the outputs of two or more tapered networks as in Fig. 4 may be combined to provide triangular or other shaped voltage pulses as may be desired for any particular application. It will be apparent that a variety of pulse shapes may also be obtained by combining networks of the type shown in Fig. 1.

In other embodiments utilizing the principles of the invention for pulse forming the impedance of the network may not be continuously tapered as in the embodiment of Fig. 1. Instead the impedance of each section may be individually adjusted to provide an output pulse having the desired characteristics.

The above description of one embodiment and two applications of this invention have been made for the purpose of illustrating the principles thereof. The scope of the invention is defined in the appended claims.

What is claimed is:

1. A pulse transforming circuit comprising a voltage source and an isolating impedance, a network of series connected reactive sections and a load connected in series relationship, and a switch connected in parallel with said network and said load, each of said series connected reactive sections including a series inductance and a shunt capacitance, the inductance of each succeeding section being greater than the inductance of the immediate preceding section, the capacitance of each succeeding section being less than the capacitance of the immediately preceding section, the impedance of the first of said sections being substantially equal to the impedance of said source, the impedance of the last of said sections being substantially equal to the impedance of said load.

2. A pulse transforming circuit comprising a voltage source, an isolating impedance, a network of series connected reactive impedance sections and a load connected in series relationship, a switch connected in parallel with said network and said load, each of said series connected reactive sections including a series inductance and a shunt capacitor, the inductance of each succeeding section being greater than the inductance of the immediate preceding sections, the capacitance of each succeeding section being less than the capacitance of the immediately preceding section, the impedance of the first of said sections being substantially equal to the impedance of said source, the impedance of the last of said sections being substantially equal to the impedance of said load, and means to connect said network and said load to said voltage source through said isolating impedance to charge said network, said switch being operable to discharge said network through said load whereby the voltage across said load is given a triangle wave form.

References Cited in the file of this patent

UNITED STATES PATENTS

| | | |
|---|---|---|
| 2,018,320 | Roberts | Oct. 22, 1935 |
| 2,115,826 | Norton et al. | May 3, 1938 |
| 2,264,718 | Rust et al. | Dec. 2, 1941 |
| 2,394,389 | Lord | Feb. 5, 1946 |
| 2,413,391 | Usselman | Dec. 31, 1946 |
| 2,420,302 | Darlington | May 13, 1947 |
| 2,420,309 | Goodall | May 13, 1947 |

OTHER REFERENCES

"Communication Engineering" by W. L. Everitt, pages 241–280 and 94–126, published 1937 by McGraw-Hill Book Co. Inc., New York, N. Y.